(12) United States Patent
Huang et al.

(10) Patent No.: US 10,868,695 B2
(45) Date of Patent: Dec. 15, 2020

(54) DATA TRANSMISSION APPARATUS AND METHOD THEREOF

(71) Applicant: Wistron Corporation, New Taipei (TW)

(72) Inventors: Ming-Syun Huang, New Taipei (TW); Yuan-Pin Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 67 days.

(21) Appl. No.: 15/712,149

(22) Filed: Sep. 22, 2017

(65) Prior Publication Data

US 2018/0367333 A1 Dec. 20, 2018

(30) Foreign Application Priority Data

Jun. 16, 2017 (TW) .................................. 106120261

(51) Int. Cl.
*H04L 12/403* (2006.01)
*H04L 12/40* (2006.01)
*G06F 13/40* (2006.01)

(52) U.S. Cl.
CPC ........ *H04L 12/403* (2013.01); *G06F 13/4022* (2013.01); *H04L 12/40013* (2013.01); *H04L 12/40032* (2013.01)

(58) Field of Classification Search
CPC ............. H04L 12/403; H04L 12/40032; H04L 12/40013; G06F 13/00
See application file for complete search history.

(56) References Cited

U.S. PATENT DOCUMENTS

| 5,343,469 | A | * | 8/1994 | Ohshima | H04L 12/40013 370/431 |
| 5,586,269 | A | * | 12/1996 | Kubo | G06F 12/0669 340/3.5 |
| 5,697,048 | A | * | 12/1997 | Kimura | H04B 1/205 348/E7.051 |
| 6,134,665 | A | * | 10/2000 | Klein | H04L 12/10 713/300 |
| 2009/0157929 | A1 | * | 6/2009 | Pigott | G06F 13/4291 710/110 |
| 2012/0246368 | A1 | | 9/2012 | Kwon | |

(Continued)

*Primary Examiner* — Sai Aung
*Assistant Examiner* — Liem H. Nguyen
(74) *Attorney, Agent, or Firm* — Winston Hsu

(57) ABSTRACT

A data transmission apparatus for data transmission having a plurality of master devices, at least one slave device, a transmission channel monitoring circuit, and a master device observer circuit is provided. A first master device of the master devices performs a first data transmission, and a second master device requests for a second data transmission to the slave device before completing the first data transmission. By detecting an idle-busy status of a channel of the slave device with the transmission channel monitoring circuit, the master device observer circuit switches the second master device to a waiting mode or a transmission mode according to the idle-busy status of the channel of the slave device. In addition, the waiting mode suspends the second data transmission and to wait for completion of the first data transmission, and the transmission mode performs the second data transmission. A data transmission method is also provided.

15 Claims, 6 Drawing Sheets

(56) References Cited

U.S. PATENT DOCUMENTS

2016/0147707 A1\* 5/2016 Freudenberger .... G06F 13/4291
  710/110
2018/0046595 A1\* 2/2018 Pitigoi-Aron ....... G06F 13/4295
2018/0357199 A1\* 12/2018 Mishra ................ G06F 13/4282

\* cited by examiner

DATA TRANSMISSION APPARATUS AND METHOD THEREOF

CROSS-REFERENCE TO RELATED APPLICATION

This application claims the priority benefit of Taiwan application serial no. 106120261, filed on Jun. 16, 2017. The entirety of the above-mentioned patent application is hereby incorporated by reference herein and made a part of this specification.

BACKGROUND OF THE INVENTION

1. Field of the Invention

The invention relates to a data transmission technique, and particularly relates to a data transmission apparatus and a method of the data transmission apparatus adapted for a server system.

2. Description of Related Art

With the advancement of science and technology, various improvement has been made to the specifications of the respective apparatuses in a server system. Thus, in a conventional high-density computation server, a framework where a plurality of computing nodes share a backboard in a system becomes much more common. In order for the server manufacturer to reduce hardware and software revisions, a computing node only has one hardware version. Therefore, computing nodes of the same model use a master device with the same transmission protocol (e.g., $I^2C$ bus) to access a slave device of the backboard, so as to retrieve a system status (e.g., fan speed, power consumption in watts, and the like). Due to the same topology, serially connecting all the buses may result in a location conflict when the master devices having the same address intend to access the slave devices. Thus, a switcher is required to switch the bus of the slave device to the computing node requiring access.

SUMMARY OF THE INVENTION

The invention provides a data transmission method and a method thereof capable of preventing a plurality of master devices from accessing the same slave device at the same time that may lead to an access failure in the master devices to which the slave device is not switched. Accordingly, automatic switching is enabled when multiple master devices access the same slave device, and data are able to be transmitted completely without losing a packet.

A data transmission apparatus according to an embodiment of the invention includes a plurality of master devices, at least one slave device, a switching circuit, a determining circuit, a master device observer circuit, and a transmission channel monitoring circuit. The switching circuit is coupled to the master devices through a data transmission interface. The at least one slave device is coupled to the switching circuit through the data transmission interface. The determining circuit is coupled to the switching circuit, the master devices, and the slave device. The master device observer circuit is coupled to the determining circuit and the master devices. The transmission channel monitoring circuit is coupled to the slave device and the determining circuit to detect an idle-busy status of a transmission channel of the slave device. A first master device of the master devices performs a first data transmission with the slave device, and a second master device of the master devices transmits an access signal to request to perform a second data transmission with the slave device before the first data transmission is completed. The master device observer circuit switches the second master device to a waiting mode or a transmission mode based on the idle-busy status of the transmission channel. In addition, the waiting mode is configured to suspend the second data transmission of the second master device and wait for completion of the first data transmission, and the transmission mode is configured to enable the second master device to perform the second data transmission.

A data transmission method according to an embodiment of the invention is adapted for a data transmission apparatus including a plurality of master devices and at least one slave device and transmitting data through a data transmission interface. The data transmission method includes: performing a first data transmission between a first master device of the master devices and the slave device; transmitting an access signal by a second master device of the master devices before the first data transmission is completed to request to perform a second data transmission with the slave device; detecting an idle-busy status of a transmission channel of the slave device to determine whether the first data transmission is completed; and switching the second master device to a waiting mode or a transmission mode based on the idle-busy status of the transmission channel, wherein the waiting mode is configured to suspend the second data transmission of the second master device and wait for completion of the first data transmission, and the transmission mode is configured to enable the second master device to perform the second data transmission.

Based on the above, in the data transmission apparatus and the method thereof according to the embodiments of the invention, the first master device of the master devices and the slave device perform the first data transmission. When the second master device of the master devices requests to perform the second data transmission with the slave device before the first data transmission is completed, by using the transmission channel monitoring circuit to monitor the idle-busy status of the transmission channel of the slave device, the master device observer circuit is able to switch the second master device to the waiting mode or the transmission mode according to the idle-busy status of the transmission channel of the slave device. In addition, the waiting mode is configured to suspend the second data transmission and wait for the completion of the first data transmission. The transmission mode is configured to enable the second master device to perform the second data transmission. Accordingly, automatic switching between multiple master devices is enabled without controlling by resorting to additional signals. Thus, the design cost is reduced. Besides, data are able to be transmitted completely without losing a packet.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
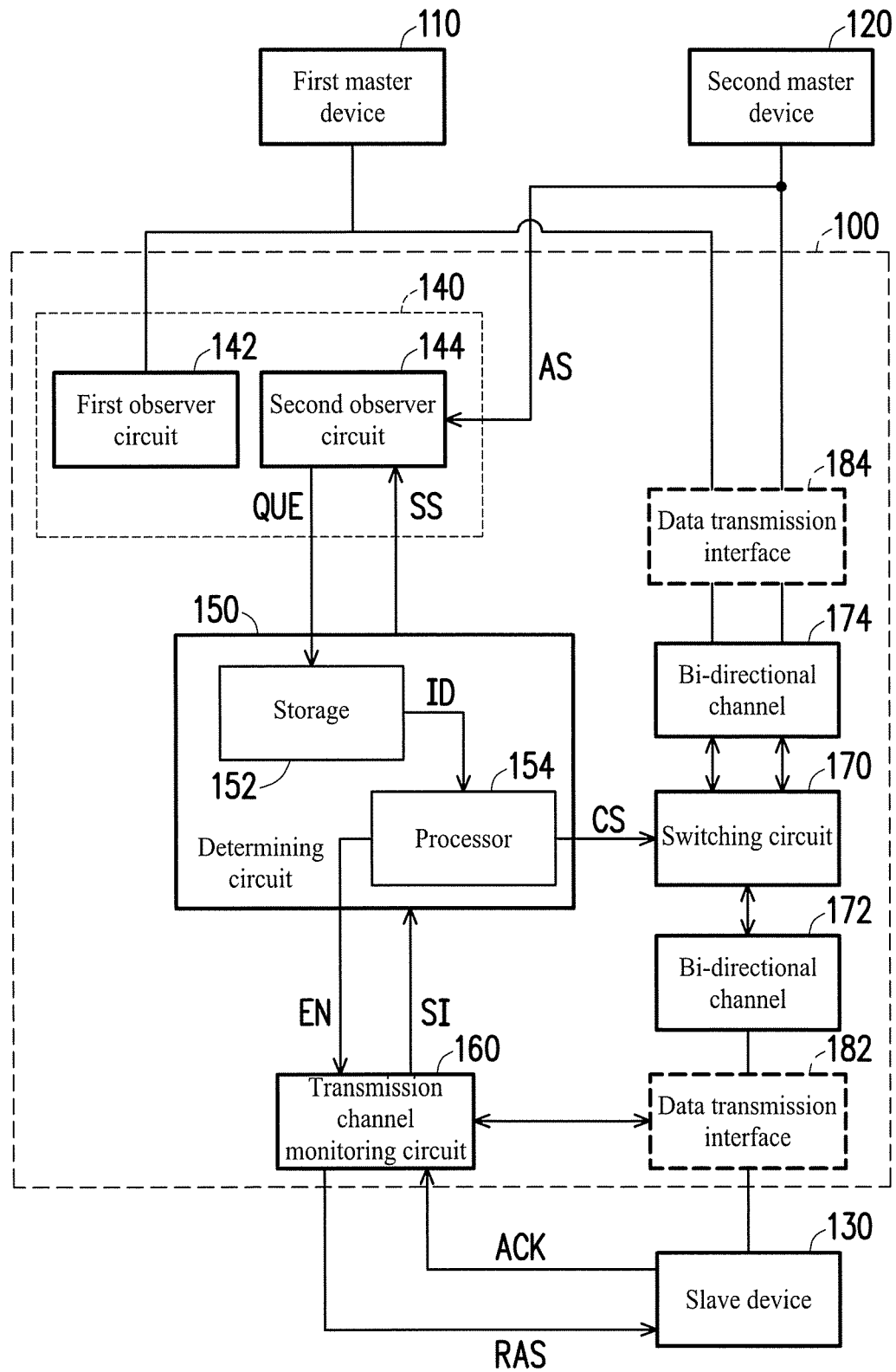
FIG. 1 is a schematic view illustrating a data transmission apparatus according to an embodiment of the invention.

Descriptions of the invention are given with reference to the exemplary embodiments illustrated with accompanied drawings, wherein same or similar parts are denoted with same reference numerals. In addition, whenever possible, identical or similar reference numbers stand for identical or similar elements in the figures and the embodiments.

FIG. 1 is a schematic view illustrating a data transmission apparatus according to an embodiment of the invention. Referring to FIG. 1, a data transmission apparatus 10 includes a plurality of master devices, such as a first master device 110, a second master device 120, at least one slave device 130, and a transmitting circuit 100. The master devices perform data transmission with the slave device 130 through the transmitting circuit 100. The transmitting circuit 100 may be implemented as a programmable logic device, such as a complex programmable logic device (CPLD), a field programmable gate array (FPGA), or other devices having a similar function. It should be noted that the invention is not limited thereto.

The transmitting circuit 100 includes a master device observer circuit 140, a determining circuit 150, a transmission channel monitoring circuit 160 and a switching circuit 170. The master device observer circuit 140 is coupled to the determining circuit 150, the first master device 110, and the second mater device 120. The determining circuit 150 is coupled to the switching circuit 170, the master device observer circuit 140, and the transmission channel monitoring circuit 160. The transmission channel monitoring circuit 160 is coupled to the slave device 130 and the determining circuit 150.

Through a data transmission interface 184, the first master device 110 and the second master device 120 are coupled to an end of the switching circuit 170. The other end of the switching circuit 170 is coupled to the slave device 130 through a data transmission interface 182. In the embodiment, the data transmission interfaces 182 and 184 are $I^2C$ transmission interfaces, for example. The first master device 110 and the second mater device 120 perform data transmissions through arrangement of the switching circuit 170, respectively.

In the embodiment, a bi-directional channel 174 is disposed between the first and second master devices 110 and 120 and the switching circuit 170, and a bidirectional channel 172 is disposed between the slave device 130 and the switching circuit 170. An end of the bi-directional channel 172 is coupled to the switching circuit 170, and the other end of the bi-directional channel 172 is coupled to the slave device 130. In addition, the bi-directional channels 172 and 174 are logical channels, for example.

In the embodiment, the master device observer circuit 140 includes a plurality of observer circuits. Each of the observer circuits is coupled to one of the master devices. For example, a first observer circuit 142 is coupled to the determining circuit 150 and the first master device 110, and a second observer circuit 144 is coupled to the determining circuit 150 and the second master device 120. In the embodiment, the numbers of the master device, the slave device, and the observer circuit are only described as an example. The invention does not intend to limit the numbers of the master device, the slave device, and the observer circuit.

Figure 2:
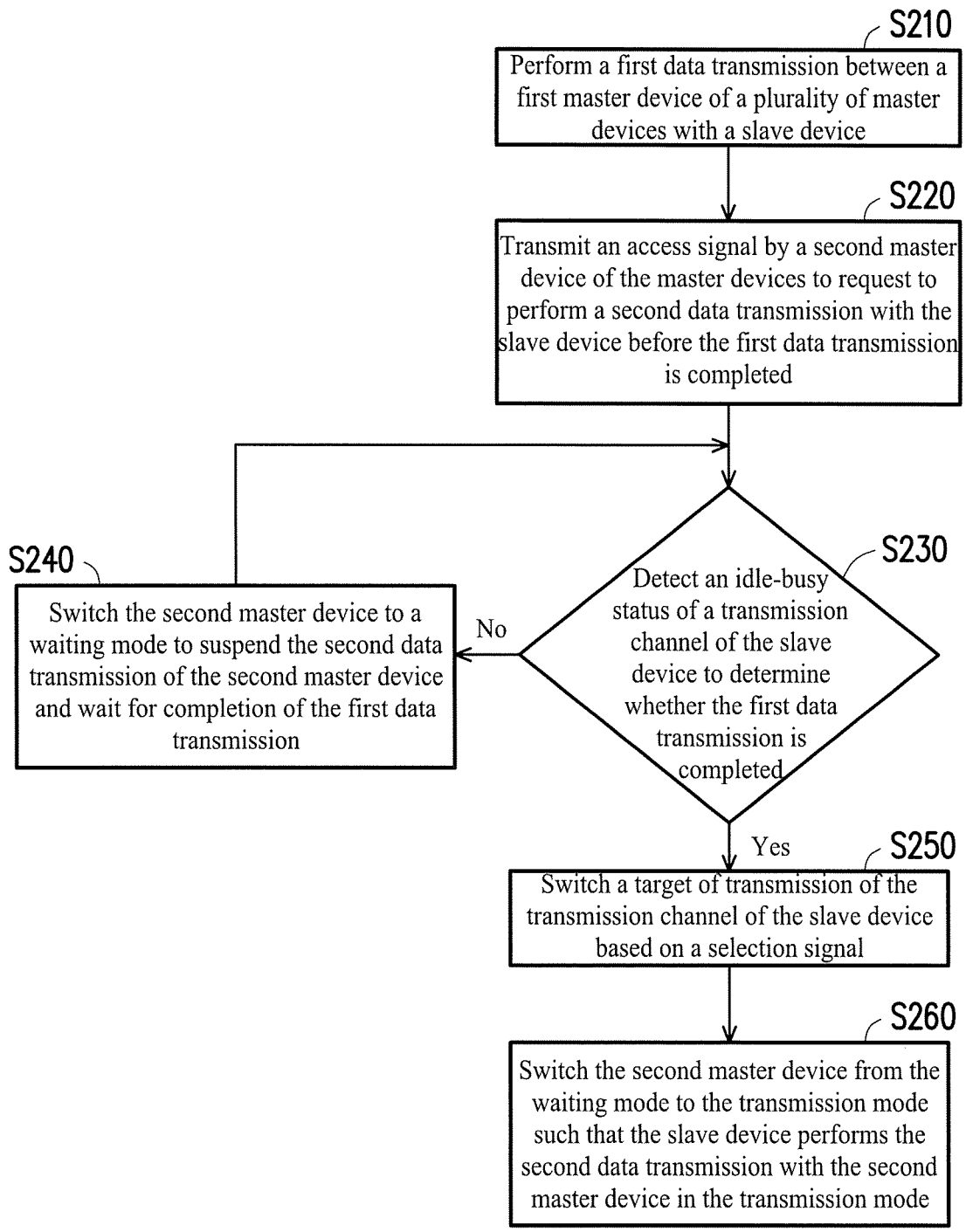
FIG. 2 is a flowchart illustrating a data transmission method according to an embodiment of the invention.
Figure 3:
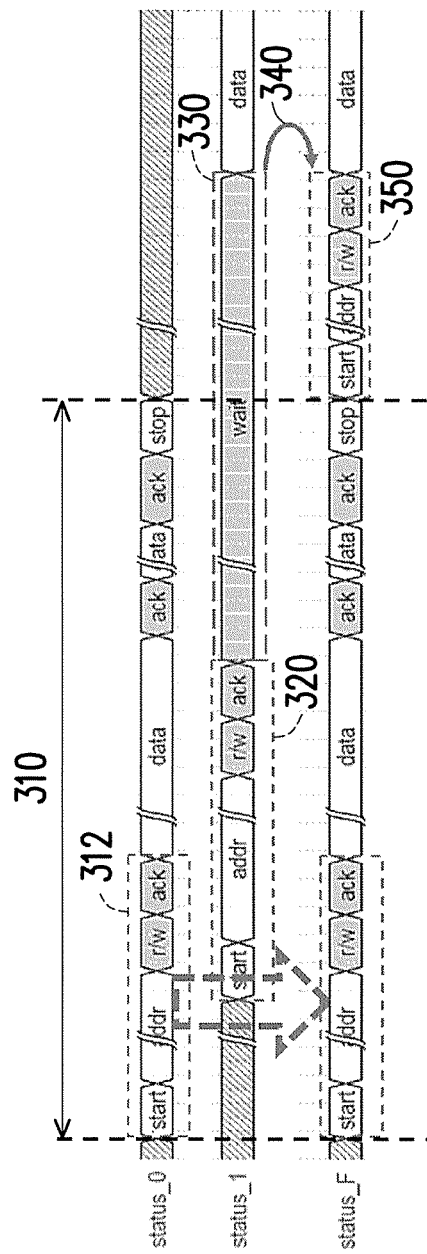
FIG. 3 is a schematic view illustrating a process of data transmission between a plurality of master devices and a slave device according to an embodiment of the invention.

Referring to FIGS. 1 and 3 together with FIG. 2, FIG. 2 is a flowchart illustrating a data transmission method according to an embodiment of the invention, and FIG. 3 is a schematic view illustrating a process of data transmission between a plurality of master devices and a slave device according to an embodiment of the invention. A data transmission method 20 is suitable for the embodiments shown in FIGS. 1 and 3. In the following, the data transmission method 20 according to an embodiment of the invention is described in detail as follows.

At Step S210, the first master device 110 of the master devices performs a first data transmission 310 with the slave device 130. A status_0 in FIG. 3 refers to a clock frequency variation of the first master device 110, a status_1 refers to a clock frequency variation of the second master device, and a status_F refers to a clock frequency variation of the slave channel 130. When the slave device 130 is in an idle status, the first master device 110 accesses the slave device 130 and transmits a signal 312 requesting data access. A transmission channel of the slave device 130 is occupied by the first master device 110, and the first master device 110 and the slave device 130 start the first data transmission 310.

At Step S220, before the first data transmission 310 is completed, the second master device 120 of the master devices transmits a signal 320 requesting data access, so as to request to perform a second data transmission with the slave device 130. At Step S230, the transmission channel monitoring circuit 160 detects an idle/busy status of the transmission channel of the slave device 130. Based on the idle/busy status of the transmission channel of the slave device 130, whether the first data transmission 310 is completed is determined. Referring to FIG. 3, if the first data transmission 310 is not completed yet, the second observer circuit 144 corresponding to the second master device 120 switches the second master device 120 to a waiting mode 330 to suspend the second data transmission of the second master device 120 and wait for completion of the first data transmission 310 (Step S240). In the embodiment, the waiting mode is carried out with a function of clock stretching of an internal-integrated circuit bus ($I^2C$ bus), for example. With the function of clock stretching, a serial clock line (SCL) of a signal line of the $I^2C$ bus is maintained at a low level to suspend transmission of the second mater device 120, thereby entering the waiting mode.

If the first data transmission 310 is completed, the switching circuit 170 receives a selection signal CS from the determining circuit 150 and switches a target of transmission of the transmission channel of the slave device 130 from the first master device 110 to the second master device 120, as shown in a switching process 340 in FIG. 3 (Step S250). At Step S260, the second observer circuit 144 switches the second master device 120 from the waiting mode to the transmission mode. The transmission mode is configured to enable the second master device 120 to perform the second data transmission. The second mater device 120 starts to perform the second data transmission with the slave device 130 after being switched to the transmission mode.

It should be noted that, before Step S250, or before the second observer circuit 144 switches the second master device 120 from the waiting mode to the transmission mode, a status of the slave device may be additionally confirmed. For example, the transmission channel monitoring circuit 160 may transmit a replacement access signal RAS to the slave device 130. As an example, the replacement access signal RAS may be a signal 350 requesting data access in FIG. 3. The slave device 130 receives the signal 350 and transmits an acknowledgment signal ACK. After the transmission channel monitoring circuit 160 receives the acknowledgment signal ACK, the second observer circuit 144 switches the second master device 120 from the waiting mode to the transmission mode. Specific details in this regard may be referred to the descriptions of the embodiment of FIGS. 4A and 4B.

In the embodiment, the data transmission method 20 or the data transmission apparatus 10 detects the idle/busy status of the transmission channel of the slave device 130 by the transmission channel monitoring circuit 160. The master device observer circuit 140 may switch the second master device 120 to the waiting mode or the transmission mode based on the idle-busy status of the transmission channel of the slave device 130. In addition, the waiting mode is configured to suspend the second data transmission of the second master device 120 and wait for completion of the first data transmission. In addition, the transmission mode is configured to enable the second master device 120 to perform the second data transmission. Therefore, automatic switching among the master devices is enabled, and transmission is completed without losing a packet.

Figure 4A:
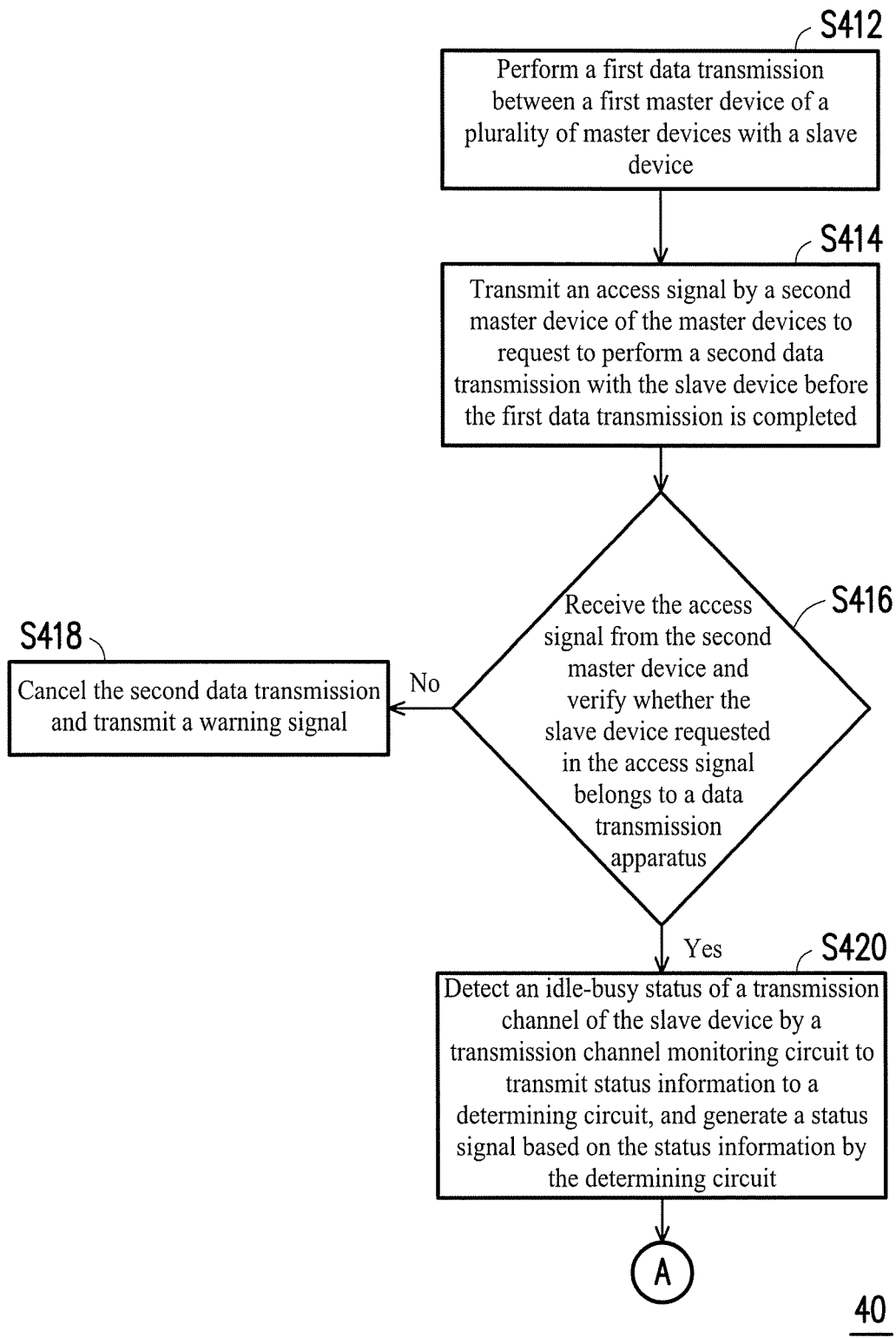
FIGS. 4A to 4B are flowcharts illustrating a data transmission method according to another embodiment of the invention.
Figure 4B:
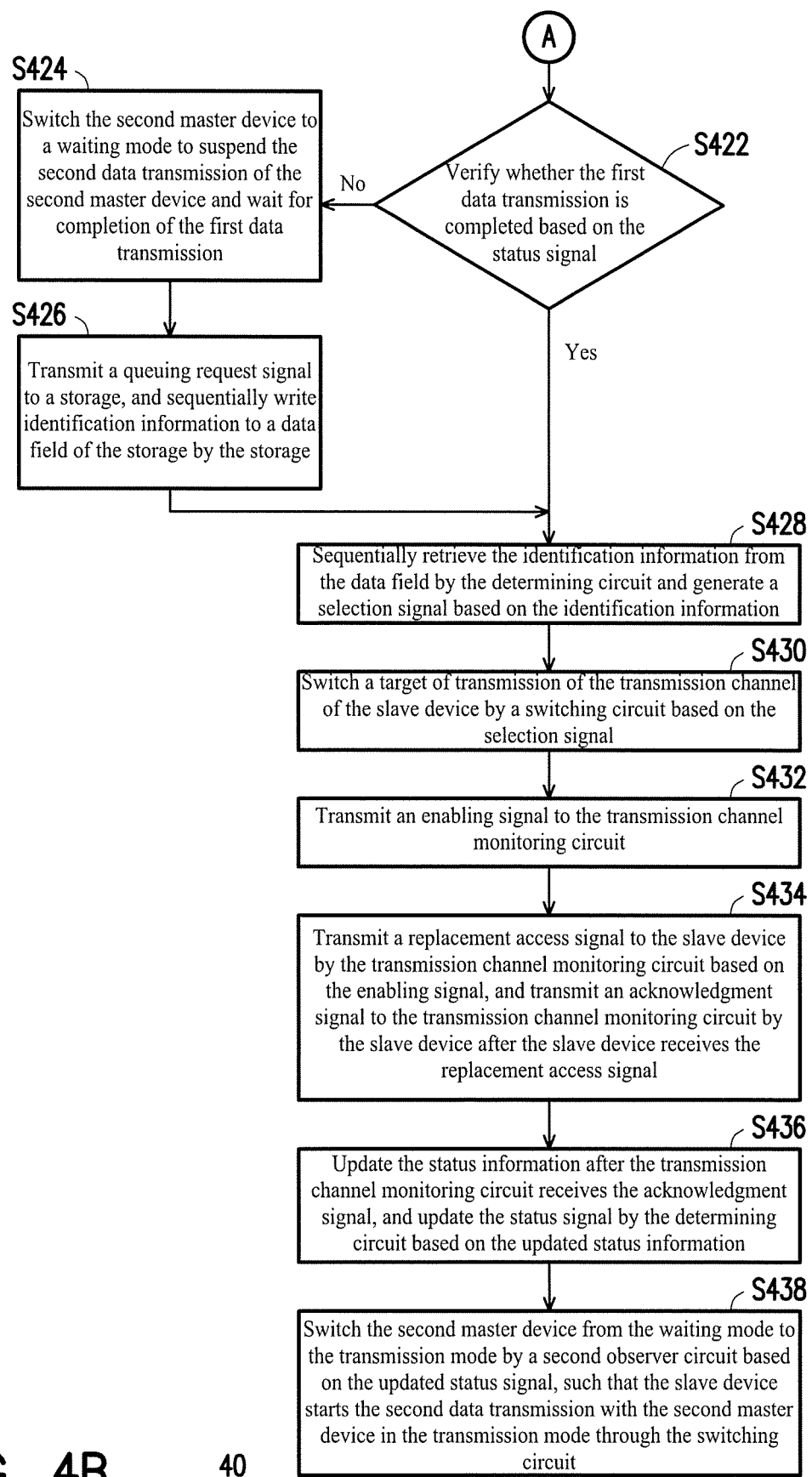
Figure 5:
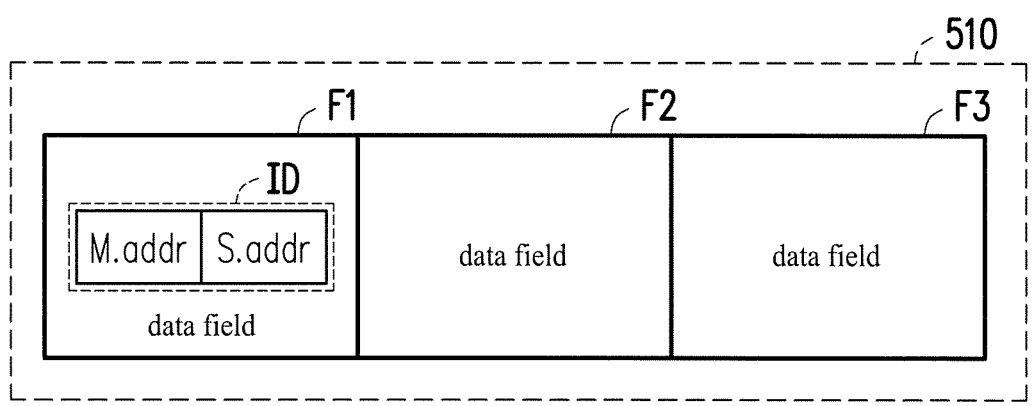
FIG. 5 is a schematic view illustrating an identification data table according to an embodiment of the invention.

In the following, referring to FIGS. 1, 3, and 5 as well as FIGS. 4A and 4B, FIGS. 4A to 4B are flowcharts illustrating a data transmission method according to another embodiment of the invention, and FIG. 5 is a schematic view illustrating an identification data table according to an embodiment of the invention. A data transmission method 40 is suitable for the embodiments shown in FIGS. 1 to 3 and 5. In the following, the data transmission method 40 according to an embodiment of the invention is described in detail as follows.

At Step S412, the first master device 110 performs a first data transmission with the slave device 130. The first data transmission is the first data transmission 310 shown in FIG. 3, for example. At Step 414, before the first data transmission is completed, the second master device 120 transmits an access signal AS to the slave device 130 through the switching circuit 170 to request to perform a second data transmission with the slave device 130. At Step S416, the second observer circuit 144 receives the access signal AS from the second master device 120 and verifies whether the slave device 130 requested in the access signal AS belongs to the data transmission apparatus 10. As an example, the access signal AS may include an address of the slave device 130, and may be the signal 320 requesting data access in FIG. 3. When it is verified that the slave device 130 requested in the access signal AS does not belong to the data transmission apparatus 10, Step S418 is performed, the second data transmission is canceled, and a warning signal is transmitted. Alternatively, when it is verified that the slave device 130 requested in the access signal AS belongs to the data transmission apparatus 10, Step S420 is performed.

At Step S420, the idle-busy status of the transmission channel of the slave device 130 is detected by the transmission channel monitoring circuit 160 to transmit status information SI to the determining circuit 150. Then, based on the status information SI, the determining circuit 150 generates a status signal SS. Specifically, the status information SI may be transmitted to a processor 154 of the determining circuit 150, and the processor 154 may generate the status signal SS based on the status information SI. However, the invention is not limited thereto. At Step S422, the determining circuit 150 further transmits the status signal SS relating to the idle-busy status of the transmission channel to the master device observer circuit 140. In the embodiment, transmission of the status signal SS to the second observer circuit 144 is described as an example. The second observer circuit 144 receives the status signal SS from the determining circuit 150, and verifies whether the first data transmission is completed based on the status signal SS.

It should be noted that the invention does not intend to impose a limitation on an order between Step S420 and Step S416. People having ordinary skills in the art may make a suitable arrangement based on practical needs.

In brief, at Step S422, the second observer circuit 144 obtains the idle-busy status of the transmission channel of the slave device 130 by receiving the status signal SS, so as to verify whether the first data transmission is completed. If the first data transmission is not completed yet, Step S424 is performed. Alternatively, if the first data transmission is completed, Step S428 is performed.

At Step S424, the second observer circuit 144 switches the second master device 120 to the waiting mode to suspend the second data transmission of the second master device 120 and wait for completion of the first data transmission. The waiting mode is carried out with the function of clock stretching of the internal-integrated circuit bus (I²C bus), for example. Then, Step S426 is performed. Referring to FIG. 1, at Step S426, after the second master device 120 is switched to the waiting mode, the second observer circuit 144 transmits a queuing request signal QUE to a storage 152 of the determining circuit 150. The determining circuit 150 includes the storage 152 and the processor 154 coupled to the storage 152. In addition, the storage 152 stores an identification data table 510 having a plurality of data fields, such as data fields F1 to F3 shown in FIG. 5. The queuing request signal QUE includes identification information ID of the second master device 120 and the slave device 130. In the embodiment of FIG. 5, the storage 152 may sequentially store the received identification information ID to one of the data fields F1 to F3. Since the current identification data table 510 of the embodiment does not store any other identification information, the identification information ID is written to the first data field F1. As an example, the identification information ID includes addresses of the second master device 120 and the slave device 130. As shown in FIG. 5, the first data field F1 stores an address M.addr of the second master device 120 and an address S.addr of the slave device 130. It should be noted that the data fields F1 to F3 in the embodiment of FIG. 5 are only shown for an illustrative purpose. The number of data fields and how the data fields are arranged shall not be limited thereto.

After the first data transmission is completed, Step S428 is performed. At Step S428, the processor 154 of the determining circuit 150 sequentially retrieves the identification from the data fields. Referring to the embodiment of FIG. 5, the processor 154 may retrieve the identification information ID from the data field F 1. Based on the retrieved identification information ID, the processor 154 generates the selection signal CS and transmits the selection signal CS to the switching circuit 170. Then, Step S430 is performed. Based on the selection signal CS, the switching circuit 170 switches the target of transmission of the transmission channel of the slave device 130 for the second master device 120 in the transmission mode performing the second data transmission with the slave device 130.

The second observer circuit 144 may switch the second master device 120 from the waiting mode to the transmission mode to start the second data transmission between the second master device 120 and the slave device 130. Reference can be found in the switching process 340 of FIG. 3. By receiving the status information SI about the idle-busy status of the transmission channel of the slave device 130, the determining circuit 150 may also determine whether the first data transmission is completed. Thus, at Step S432, after the determining circuit 150 determines that the first data transmission is completed, an enabling signal EN is transmitted to the transmission channel monitoring circuit 160. Next, at Step S434, the transmission channel monitoring circuit 160 transmits the replacement access signal RAS to the slave device 130 based on the enabling signal EN. The replacement access signal RAS may be the signal 350 for requesting data access in FIG. 3. The slave device 130 receives the replacement access signal RAS and transmits the acknowledgment signal ACK to the transmission channel monitoring circuit 160. At Step S436, after receiving the acknowledgment signal ACK, the transmission channel monitoring circuit 160 may update the status information SI transmitted to the determining circuit 150. Based on the updated status information SI, the determining circuit 150 may update the status signal SS. At Step S438, the second observer circuit 144 receives the status signal SS updated based on the acknowledgment signal ACK to verify the status of the slave device 130, and then switches the second master device 120 from the waiting mode to the transmission mode. Accordingly, the slave device 130 starts the second data transmission with the second master device 120 in the transmission mode through the switching circuit 170.

Besides, in other embodiments, data transmissions between multiple master devices and multiple slave devices may be enabled by increasing the number of the transmitting circuit 100 in FIG. 1, for example. For example, one slave device may correspond to one transmission circuit 100, and the master device may firstly designate which of the transmission channels of the slave devices to transmit data when accessing the slave device. If the designated transmission channel is in an idle status, the data may be directly transmitted. Alternatively, based on the idle-busy status of the transmission channel, the operating modes of the master device are switched. As sufficient teachings, suggestions, and explanations about the data transmission apparatus and method can be found in the embodiments of FIGS. 1 to 5, details in this regard will not be repeated in the following.

In view of the foregoing, in the data transmission apparatus and the method thereof according to the embodiments of the invention, the first master device of the master devices and the slave device perform the first data transmission. When the second master device of the master devices requests to perform the second data transmission with the slave device before the first data transmission is completed, by using the transmission channel monitoring circuit to monitor the idle-busy status of the transmission channel of the slave device, the master device observer circuit may switch the second master device to the waiting mode or the transmission mode according to the idle-busy status of the transmission channel of the slave device. In addition, the waiting mode is configured to suspend the second data transmission and wait for the completion of the first data transmission. The transmission mode is configured to enable the second master device to perform the second data transmission. Accordingly, automatic switching between multiple master devices is enabled, and data are able to be transmitted completely without losing a packet.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data transmission apparatus, comprising:
a plurality of master devices;
a switching circuit, coupled to the master devices through a data transmission interface;
at least one slave device, coupled to the switching circuit through the data transmission interface; and
a determining circuit, coupled to the switching circuit, a master device observer circuit, and a transmission channel monitoring circuit, wherein
the master device observer circuit is coupled to the determining circuit and the master devices,
the transmission channel monitoring circuit is coupled to the slave device and the determining circuit to detect an idle-busy status of a transmission channel of the slave device and transmit status information relating to the idle-busy status of the transmission channel to the determining circuit, and
the determining circuit generates a status signal relating to the idle-busy status of the transmission channel based on the status information received from the transmission channel monitoring circuit,
wherein a first master device of the master devices performs a first data transmission with the slave device,
wherein the master device observer circuit receives the status signal relating to the idle-busy status of the transmission channel from the determining circuit, and verifies whether the first data transmission is completed based on the status signal,
wherein a second master device of the master devices transmits an access signal to request to perform a second data transmission with the slave device before the first data transmission is completed,
wherein the master device observer circuit switches the second master device to a waiting mode or a transmission mode based on the idle-busy status of the transmission channel,
wherein the waiting mode is configured to suspend the second data transmission of the second master device and wait for completion of the first data transmission, and the transmission mode is configured to enable the second master device to perform the second data transmission,
wherein after the first data transmission is completed, the determining circuit transmits an enabling signal to the transmission channel monitoring circuit, and the transmission channel monitoring circuit transmits a replacement access signal to the slave device based on the enabling signal, such that the slave device starts the second data transmission with the second master device in the transmission mode through the switching circuit, and
wherein the replacement signal comprises a plurality of different fields, in which at least one of the fields comprises identification information of the master devices and the slave device in a same field;
wherein the switching circuit receives a selection signal from the determining circuit and switches a target of transmission of the transmission channel based on the selection signal;

wherein only one of the first master device and the second master is selected by the switching circuit to connect to the slave device.

2. The data transmission apparatus as claimed in claim 1, wherein the master device observer circuit comprises a plurality of observer circuits, and each of the observer circuits is coupled to one of the master devices.

3. The data transmission apparatus as claimed in claim 1, wherein the data transmission interface comprises an I²C transmission interface, and the waiting mode is capable of clock stretching.

4. The data transmission apparatus as claimed in claim 1, wherein the master device observer circuit receives the access signal and verifies whether the slave device requested in the access signal belongs to the data transmission apparatus, and the access signal comprises an address of the slave device.

5. The data transmission apparatus as claimed in claim 1, wherein the determining circuit comprises:
a processor, coupled to a storage and the switching circuit, wherein the storage stores an identification data table having a plurality of data fields, and
wherein the master device observer circuit transmits a queuing request signal to the storage when the second master device is switched to the waiting mode, the queuing request signal comprises identification information of the second master device and the slave device, and the storage sequentially stores the identification information to one of the data fields.

6. The data transmission apparatus as claimed in claim 5, wherein after the first data transmission is completed, the processor sequentially retrieves the identification information from one of the data fields, and generates the selection signal based on the retrieved identification information.

7. The data transmission apparatus as claimed in claim 1, further comprising:
a bi-directional channel, wherein one end of the bi-directional channel is coupled to the switching circuit, and the other end of the bi-directional channel is coupled to the slave device.

8. A data transmission method, adapted for a data transmission apparatus comprising a plurality of master devices and at least one slave device and transmitting data through a data transmission interface, the data transmission method comprising:
performing a first data transmission between a first master device of the master devices and the slave device;
transmitting an access signal by a second master device of the master devices before the first data transmission is completed to request to perform a second data transmission with the slave device;
detecting an idle-busy status of a transmission channel of the slave device by a transmission channel monitoring circuit to transmit status information to a determining circuit, wherein the determining circuit generates a status signal based on the status information;
receiving the status signal from the determining circuit and verifying whether the first data transmission is completed based on the status signal; and
switching the second master device to a waiting mode or a transmission mode based on the idle-busy status of the transmission channel,
wherein the waiting mode is configured to suspend the second data transmission of the second master device and wait for completion of the first data transmission, and the transmission mode is configured to enable the second master device to perform the second data transmission,
wherein after the first data transmission is completed, the determining circuit transmits an enabling signal to the transmission channel monitoring circuit, and the transmission channel monitoring circuit transmits a replacement access signal to the slave device based on the enabling signal, such that the slave device starts the second data transmission with the second master device in the transmission mode through the switching circuit, and
wherein the replacement signal comprises a plurality of different fields, in which at least one of fields comprises identification information of the master devices and the slave device in a same field;
wherein a target of transmission of the transmission channel is switched based on a selection signal;
wherein only one of the first master device and the second master is selected by the switching circuit to connect to the slave device.

9. The data transmission method as claimed in claim 8, wherein the data transmission interface comprises an I²C transmission interface, and the waiting mode is capable of clock stretching.

10. The data transmission method as claimed in claim 8, further comprising:
verifying whether the slave device requested in the access signal belongs to the data transmission apparatus, wherein the access signal comprises an address of the slave device.

11. The data transmission method as claimed in claim 8, wherein switching the second master device to the waiting mode or the transmission mode based on the idle-busy status of the transmission channel comprises:
switching the second master device to the waiting mode if the first data transmission is not completed yet; and
switching the second master device from the waiting mode to the transmission mode when the first data transmission is completed.

12. The data transmission method as claimed in claim 8, wherein switching the second master device to the waiting mode if the first data transmission is not completed yet comprises:
transmitting a queuing request signal to a storage in the determining circuit,
wherein the queuing request signal comprises identification information of the second master device and the slave device, and the storage sequentially stores the identification information to one of a plurality of data fields in the storage.

13. The data transmission method as claimed in claim 12, wherein switching the second master device from the waiting mode to the transmission mode when the first data transmission is completed comprises:
sequentially retrieving the identification information from one of the data fields by the determining circuit and generating the selection signal based on the retrieved identification information.

14. The data transmission apparatus as claimed in claim 1, wherein the data transmission interface comprises an I²C transmission interface, and supports a high speed mode of the I²C transmission interface.

15. The data transmission method as claimed in claim 8, wherein the data transmission interface comprises an I2C transmission interface, and supports a high speed mode of the I2C transmission interface.

\* \* \* \* \*